3,167,433
PLASTICIZED YEAST
Ira A. MacDonald and Alan S. Geisler, Wilmington, Del., assignors to Atlas Chemical Industries, Inc., Wilmington, Del., a corporation of Delaware
No Drawing. Filed July 11, 1962, Ser. No. 209,259
4 Claims. (Cl. 99—96)

This invention relates to plasticizing compositions, and in particular, to compositions which may be used as plasticizers, lubricants and whitening agents for yeast. In addition, this invention relates to yeast compositions containing the novel plasticizers of this invention.

This application is a continuation-in-part of the patent application Serial No. 116,268 filed June 12, 1961, now abandoned.

In the production of active, compressed yeast, the following procedure is generally followed:

(1) After propagation, the yeast has most of the excess water removed by either centrifugation or crude filtration. The resulting composition is referred to as a "cream" by those skilled in the art.

(2) Additional water is removed from the cream in a filter press.

(3) The pressed yeast cakes are removed from the filter and broken up, and the moisture content is standardized. Thereafter, the yeast is extruded in suitable form for packaging.

(4) The extruded yeast is cut into blocks and packaged.

It is the normal practice in the art to add a lubricant to the yeast to improve its extrudability and to enable the yeast to be cut cleanly prior to packaging. In addition, the lubricant is expected to act as a plasticizer so that the yeast cake has a reduced tendency to crumble during storage. It is considered desirable for the plasticizer (lubricant) to enhance the "whiteness" of the yeast and also to reduce the tendency of the final yeast cake to "water spot."

Compounds which have been used as yeast plasticizers, and some of which are currently used as such, include: lecithin, laurate esters of sorbitol, sorbitan and other polyhydric alcohols, and a mixture of refined soybean oil, fatty acid esters and an alkaline salt of sulfated degummed soybean oil.

It is an object of this invention to provide a yeast plasticizer-lubricant composition.

Another object is to provide a yeast plasticizer which is a liquid at normal ambient temperatures.

Another object of this invention is to provide a yeast plasticizer which alone, or in combination with an edible vegetable oil, serves as a lubricant for yeast during the processing steps involved in its production.

A further object is to provide a yeast plasticizer which alone, or in combination with an edible vegetable oil, enables yeast to remain at room temperature conditions for several days in a firm, moist block.

A still further object of the invention is to provide a yeast plasticizer which alone, or in combination with an edible vegetable oil, acts as a "whitening" agent for yeast and also reduces the tendency of the final yeast product to "water spot."

Other objects and purposes of this invention will be apparent to those skilled in the art in view of the description which follows.

It has been discovered that lactated lauric acid mono- and diglycerides may be used alone, and in combination with an edible, normally liquid vegetable oil, as an effective yeast plasticizer. The addition of lactated lauric acid mono- and diglycerides to yeast produces a yeast composition which can be cleanly cut and which can be stored at room temperature for several days without becoming dry and crumbly. Yeast compositions containing the novel plasticizers of this invention have improved "whiteness" and also have a reduced tendency to "water spot." An additional advantage of these novel yeast plasticizers is that they are liquids at normal ambient temperatures, and therefore, they do not require heating prior to use.

The lactated lauric acid mono- and diglycerides, used as yeast plasticizers in accordance with this invention, may be prepared by conventional esterification procedures which are known in the art and do not have to be described in detail. The reactants used to prepare the lactated lauric acid mono- and diglycerides may be reacted in any order.

Glycerine or a fatty acid glyceride may be used to supply the glycerine reactant. The lactic acid groups may be supplied by lactic acid or its equivalent, such as a halide, anhydride, or ester. Likewise, the lauric acid groups may be supplied by lauric acid or its equivalent, such as a halide, anhydride or ester. In addition, the lauric acid source may be a mixture of fatty acids or their equivalents which contain at least 25 weight percent of lauric acid or its equivalent. Natural sources of lauric acid groups may also be used in preparing lactated lauric acid mono- and diglycerides, such as coconut oil and palm kernel oil, provided that their ester radical could contain at least 25 weight percent of lauric acid radical. Coconut oil is a particularly preferred source of lauric acid groups.

The term "lactated lauric acid mono- and diglycerides" as used in this specification and the claims which follow, includes the glyceride products prepared from any of the above-mentioned reactants. These reactants may have been reacted all together or in any order so as to produce a mixed ester of glycerin, lactic acid and lauric acid, for it has been found that useful products are obtained independently of the order of reaction.

Regardless of the lactic acid and lauric acid sources and the method of preparation, the resulting lactated lauric acid mono- and diglycerides should have approximately the following analysis.

| Group: | Mole ratios |
|---|---|
| Glyceryl radical | 1 |
| Fatty acid radicals | 1.07–2.15 |
| Lactic acid radical | 0.32–1.25 |
| A preferred range of mole ratios is: | |
| Glyceryl radical | 1 |
| Fatty acid radicals | 1.4–1.6 |
| Lactic acid radicals | 0.75–0.95 |

In addition, the lactated lauric acid mono- and diglycerides should not be completely esterified, i.e., the mole ratio of carboxylic acid groups per glyceryl radical should be less than about 2.8 to 1. If coconut oil is used as the lauric acid source in the preparation of the lactated lauric acid mono- and diglycerides, it should be noted that the coconut oil is a source of glyceryl radical as well as fatty acid radicals, which fact must be taken into account in order to keep the final product within the desired mole ratios of glyceryl, fatty acid and lactic acid radicals.

As previously stated, the lactated lauric acid mono- and diglycerides may be used alone as a yeast plasticizer, or it may be used in combination with an edible, normally liquid vegetable oil. Examples of edible, normally liquid vegetable oils which may be combined with the lactated lauric acid mono- and diglycerides are refined soybean oil, cottonseed oil, peanut oil, corn oil, etc. The edible, normally liquid vegetable oils act as lubricants for the yeast and also help to reduce the cost of the yeast additive, for the lactated lauric acid mono- and diglycerides are effective plasticizers at lower levels when used in combination with edible, normally liquid vegetable oils.

Lactated lauric acid mono- and diglycerides may be used as yeast plasticizers in amounts ranging from about 0.1 to about 0.5 weight percent of the final compressed yeast cake. In general, if less than about 0.1 weight percent of plasticizer is used, the yeast cake may tend to be somewhat harder than preferred. Amounts of plasticizer greater than about 0.5 weight percent may tend to form yeast cakes which are somewhat softer than preferred. It is particularly preferred to add the plasticizer in amounts of about 0.2 to about 0.3 weight percent of the final compressed yeast.

If the lactated lauric acid mono- and diglycerides are used in combination with an edible, normally liquid vegetable oil, the glyceride should constitute at least about 25 weight percent of the combined glyceride and oil composition. If a lactated lauric acid mono- and diglyceride/edible, normally liquid vegetable oil composition is used to plasticize yeast, it should be present in the final compressed yeast in amounts sufficient to provide the desired amount of lactated lauric acid mono- and diglycerides.

The lactated lauric acid mono- and diglycerides are normally liquids and readily combine with edible, normally liquid vegetable oils. Since the yeast plasticizers of this invention are liquids, they may be added to the yeast either before it is separated from the wort or during the "cream" stage.

The following operative examples illustrate the preparation and advantages of the yeast plasticizers of this invention.

*Example I*

A lactated lauric acid mono- and diglyceride mixture was prepared using coconut oil as the lauric acid source. 190.7 pounds of coconut oil (Cobee Refined Edible Coconut Oil), 29.1 pounds of glycerol containing 0.97 weight percent water, 120 grams of activated carbon (Darco S-51FF Activated Carbon) and 283 grams of a 35.2% sodium hydroxide solution were charged to a reactor. Steam was passed through the charge, the reactor pressure was maintained at about 125 mm. of Hg absolute, and the reactants were heated to 210° C. and held at this temperature for one hour.

Then 257 grams of 85% phosphoric acid and 62.1 pounds of 80% lactic acid were added to the reaction mixture. The pressure was increased to 500 mm. Hg absolute and the reactants were heated to 210° C. The pressure was slowly reduced to 30 mm. Hg absolute at a rate sufficient to maintain a moderate reflux.

The reaction mixture was transferred to a press feed tank and filtered at 82° C. Thereafter, 45.4 grams of a solution containing 25% butylated hydroxyl anisole, 12.5% anhydrous citric acid and 62.5% U.S.P. propylene glycol were added to the filtered reaction mixture which was then agitated for a few minutes.

The resulting product was a liquid mixture of lactated lauric acid mono- and diglycerides.

*Example II*

The following compositions were evaluated as yeast plasticizers. All amounts are in percent by weight of pressed yeast cake unless otherwise stated. The lactated lauric acid mono- and diglyceride mixture prepared in Example I was used in these evaluations.

| No. | Amount, percent | Plasticizer |
|---|---|---|
| 1 | 0.50 | Lactated lauric acid mono- and diglyceride. |
| 2 | 0.25 | Lactated lauric acid mono- and diglyceride. |
|   | 0.25 | Soybean oil. |
| 3 | 0.125 | Lactated lauric acid mono- and diglyceride. |
|   | 0.375 | Soybean oil. |
| 4 | 0.083 | Lactated lauric acid mono- and diglyceride. |
|   | 0.417 | Soybean oil. |
| 5 | 0.50 | Control (commercial yeast plasticizer). |

The above-listed compositions were all liquids and were easy to handle. They were incorporated into the yeast after the filtration step of the yeast manufacturing process.

The following results were obtained from a visual examination of the yeast cake samples:

| Plasticizer No. | Whiteness | Plasticity | Tendency to Crumble |
|---|---|---|---|
| 1 | Very good | Very soft | Very slight. |
| 2 | Good | Soft | Slight. |
| 3 | Fair | Moderately soft | Do. |
| 4 | do | do | Moderate. |
| 5 | do | Slightly hard | Excessive. |

These results indicate that the yeast plasticizers of this invention are very effective. In the test using lactated coconut oil mono- and diglycerides alone (plasticizer No. 1), the resulting yeast cake was somewhat softer than preferred but the yeast cake can easily be made a little harder by reducing the amount of plasticizer. The results using plasticizers Nos. 2 and 3 were very good, and the optimum amount of lactated lauric acid mono- and diglyceride seems to be between the amounts used in Nos. 2 and 3. The amount of lactated lauric acid mono- and diglyceride used in Test No. 4 was inadequate to prevent crumbling of the yeast cake.

The term "consisting essentially of," as used in the claims which follow, includes compositions containing the named ingredients and any other ingredients which do not deleteriously affect the compositions for the purposes stated in the specification.

Having completely described this invention, what is claimed is:

1. A yeast composition which contains from about 0.1 to about 0.5 weight percent of lactated lauric acid mono- and diglycerides which contain from about 0.3 to about 1.25 lactate groups per glyceryl radical.

2. A yeast composition which contains from about 0.1 to about 0.5 weight percent of lactated coconut oil mono- and diglycerides which contain from about 0.3 to about 1.25 lactate groups per glyceryl radical.

3. A yeast composition which contains an edible, normally liquid vegetable oil and from about 0.1 to about 0.5 weight percent of lactated lauric acid mono- and diglycerides, which contain from about 0.3 to about 1.25 lactate groups per glyceryl radical, provided that the lactated lauric acid mono- and diglycerides amount to at least about 25 percent by weight of the total edible, normally liquid vegetable oil-lactated lauric acid mono- and diglycerides content.

4. A yeast composition in accordance with claim 3 in which the lactated lauric acid mono- and diglycerides are lactated coconut oil mono- and diglycerides.

References Cited in the file of this patent

UNITED STATES PATENTS

| | | |
|---|---|---|
| 2,223,465 | Schultz et al. | Dec. 3, 1940 |
| 3,012,048 | Shapiro | Dec. 5, 1961 |
| 3,021,221 | Farbak et al. | Feb. 13, 1962 |
| 3,029,147 | Radlove | Apr. 10, 1962 |